US012594811B2

(12) United States Patent
Jin et al.

(10) Patent No.: US 12,594,811 B2
(45) Date of Patent: Apr. 7, 2026

(54) VALVE SET INTEGRATED MODULE, VEHICLE THERMAL MANAGEMENT SYSTEM, AND VEHICLE

(71) Applicant: BYD COMPANY LIMITED, Shenzhen (CN)

(72) Inventors: Wei Jin, Shenzhen (CN); Min Xu, Shenzhen (CN); Shibai Li, Shenzhen (CN); Meijiao Ye, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 274 days.

(21) Appl. No.: 18/373,959

(22) Filed: Sep. 27, 2023

(65) Prior Publication Data
US 2024/0017587 A1 Jan. 18, 2024

Related U.S. Application Data

(63) Continuation of application No. PCT/CN2022/095513, filed on May 27, 2022.

(30) Foreign Application Priority Data

May 31, 2021 (CN) .......................... 202110603349.4

(51) Int. Cl.
*B60H 1/00* (2006.01)

(52) U.S. Cl.
CPC ..... *B60H 1/00485* (2013.01); *B60H 1/00278* (2013.01); *B60H 1/00921* (2013.01);
(Continued)

(58) Field of Classification Search
CPC ............ B60H 1/00485; B60H 1/00278; B60H 1/00921; B60H 2001/00307; B60H 2001/00928
See application file for complete search history.

(56) References Cited

U.S. PATENT DOCUMENTS

2021/0053415 A1 2/2021 Oh et al.

FOREIGN PATENT DOCUMENTS

CN 107351632 A 11/2017
CN 111038216 A 4/2020
(Continued)

OTHER PUBLICATIONS

JP-2021047000-A translation.*
International Search Report and Written Opinion for Application No. PCT/CN2022/095513, mailed on Aug. 30, 2022, 11 pages.

*Primary Examiner* — Elizabeth J Martin

(74) *Attorney, Agent, or Firm* — Sheppard Mullin Richter & Hampton LLP

(57) ABSTRACT

An integrated valve module includes a base and a valve set disposed on the base and including a first switch valve, a second switch valve, and a first expansion valve. An indoor condenser outlet interface configured to connect with an outlet of an indoor condenser and communicate with an inlet of the first switch valve, an outdoor heat exchanger outlet interface configured to connect with an outlet of an outdoor heat exchanger and communicate with an inlet of a second switch valve, and a battery pack heat exchanger inlet interface configured to connected with a refrigerant inlet of a battery pack heat exchanger and communicate with an outlet of the first expansion valve, are disposed on the base. An outlet of the first switch valve, an inlet of the first expansion valve, and an outlet of the second switch valve communicate with a first flow channel disposed on the base.

18 Claims, 7 Drawing Sheets

(52) U.S. Cl.
CPC ..............  *B60H 2001/00307* (2013.01); *B60H*
*2001/00928* (2013.01)

(56)                  References Cited

FOREIGN PATENT DOCUMENTS

| | | | |
|---|---|---|---|
| CN | 111976416 | A | 11/2020 |
| CN | 112432396 | A | 3/2021 |
| JP | H1123071 | A | 1/1999 |
| JP | 2021047000 | A * | 3/2021 |
| KR | 100978680 | B1 | 8/2010 |
| KR | 20190033114 | A | 3/2019 |
| WO | 2020/040418 | A1 | 2/2020 |
| WO | 2021/048095 | A1 | 3/2021 |

* cited by examiner

VALVE SET INTEGRATED MODULE, VEHICLE THERMAL MANAGEMENT SYSTEM, AND VEHICLE

CROSS-REFERENCE TO RELATED APPLICATIONS

This application is a Continuation Application of International Patent Application No. PCT/CN2022/095513, filed on May 27, 2022, which is based on and claims priority to and benefits of Chinese Patent Application No. 202110603349.4, filed on May 31, 2021. The entire content of all of the above-referenced applications is incorporated herein by reference.

FIELD

The present disclosure belongs to the field of vehicle technologies, and particularly, to an integrated valve module, a vehicle thermal management system, and a vehicle.

BACKGROUND

A vehicle thermal management system is an important part of a vehicle, which can change a temperature in a passenger compartment and other functions to improve driving experience of a driver and passengers. In the related art, in order to enable the vehicle thermal management system to have different operating modes and a refrigerant has different flow paths under different operating modes, multiple valve components (such as expansion valves and switch valves) are required to be disposed. The valve components are connected to the corresponding devices through pipelines. In some vehicle thermal management systems, the multiple valve components may need to be connected to a same device, which requires the use of multiple pipes and joints, resulting in an increase in the number of pipes and joints. In addition, the valve components are scattered on the pipelines, resulting in a complex and messy pipeline layout, which is not conducive to installation and later maintenance.

SUMMARY

The present disclosure provides an integrated valve module, a vehicle thermal management system, and a vehicle. The integrated valve module can reduce the complexity of pipeline configuration in the vehicle thermal management system and reduce space occupancy.

According to a first aspect of the present disclosure, the present disclosure provides an integrated valve module, including a base and a valve set disposed on the base. The valve set includes a first switch valve, a second switch valve, and a first expansion valve.

An indoor condenser outlet interface, an outdoor heat exchanger outlet interface and a battery pack heat exchanger inlet interface are formed on the base, the indoor condenser outlet interface is configured to be connected with an outlet of an indoor condenser outside the base, the outdoor heat exchanger outlet interface is configured to be connected with an outlet of an outdoor heat exchanger outside the base, and the battery pack heat exchanger inlet interface is configured to be connected with a refrigerant inlet of a battery pack heat exchanger outside the base.

A first flow channel is disposed on the base. An inlet of the first switch valve is in communication with the indoor condenser outlet interface. An outlet of the first switch valve is in communication with the first flow channel. An inlet of the first expansion valve is in communication with the first flow channel. An outlet of the first expansion valve is in communication with the battery pack heat exchanger inlet interface. The outdoor heat exchanger outlet interface is in communication with an inlet of the second switch valve. An outlet of the second switch valve is in communication with the first flow channel.

In an embodiment, the valve set further includes a second expansion valve. An indoor evaporator inlet interface configured to be connected with an inlet of an indoor evaporator outside the base is disposed on the base. An inlet of the second expansion valve is in communication with the first flow channel. An outlet of the second expansion valve is in communication with the indoor evaporator inlet interface.

In an embodiment, the valve set further includes a third switch valve. An outdoor heat exchanger inlet interface connected with an inlet of the outdoor heat exchanger is further disposed on the base. A second flow channel is further disposed in the base. The indoor condenser outlet interface is in communication with the second flow channel. The inlet of the first switch valve is in communication with the second flow channel. An inlet of the third switch valve is in communication with the second flow channel. An outlet of the third switch valve is in communication with the outdoor heat exchanger inlet interface.

In an embodiment, by turning on/off of the first switch valve and the third switch valve, a refrigerant flowing into the second flow channel through the indoor condenser outlet interface flows into the first flow channel through the first switch valve, or flows out from the outdoor heat exchanger inlet interface through the third switch valve.

In an embodiment, the valve set further includes a third expansion valve. A third flow channel is further disposed in the base. The outdoor heat exchanger inlet interface is in communication with the third flow channel. The outlet of the third switch valve is in communication with the third flow channel. An inlet of the third expansion valve is in communication with the second flow channel. An outlet of the third expansion valve is in communication with the third flow channel.

In an embodiment, by turning on/off of the third switch valve and throttling or turning off of the third expansion valve, a refrigerant flowing into the second flow channel through the indoor condenser outlet interface flows into the third flow channel through the third switch valve, or flows into the third flow channel through the third expansion valve.

In an embodiment, the base includes a first portion and a second portion. The first portion includes a first connecting surface. The second portion includes a second connecting surface. The first connecting surface is connected with the second connecting surface. The first connecting surface is recessed to form a first groove, a second groove, and a third groove. The second connecting surface and the first groove define the first flow channel. The second connecting surface and the second groove define the second flow channel. The second connecting surface and the third groove define the third flow channel.

The first switch valve, the second switch valve, the third switch valve, the first expansion valve, and the third expansion valve are all disposed on the first portion; or the first switch valve, the second switch valve, the third switch valve, the first expansion valve, and the third expansion valve are all disposed on the second portion.

In an embodiment, at least one of the first groove, the second groove, and the third groove includes a curved groove.

In an embodiment, the valve set further includes a fourth switch valve. A reflux inlet interface configured to be connected with an inlet of a compressor outside the base or an inlet of a gas-liquid separator connected with the compressor is disposed on the base. A fourth flow channel is disposed in the base. The outdoor heat exchanger outlet interface is in communication with the fourth flow channel. The inlet of the second switch valve is in communication with the fourth flow channel. An inlet of the fourth switch valve is in communication with the fourth flow channel. An outlet of the fourth switch valve is in communication with the reflux inlet interface.

In an embodiment, a fifth flow channel is disposed in the base. The outlet of the fourth switch valve is in communication with the fifth flow channel. The reflux inlet interface is in communication with the fifth flow channel. A battery pack heat exchanger outlet interface configured to be connected with a refrigerant outlet of the battery pack heat exchanger is disposed on the base. The battery pack heat exchanger outlet interface is in communication with the fifth flow channel.

In an embodiment, the fifth flow channel is disposed in the base. The outlet of the fourth switch valve is in communication with the fifth flow channel. The reflux inlet interface is in communication with the fifth flow channel. An indoor evaporator outlet interface configured to be connected with an outlet of the indoor evaporator is disposed on the base. The indoor evaporator outlet interface is in communication with the fifth flow channel.

In an embodiment, the integrated valve module further includes a temperature sensor. A first through hole, a second through hole, and a third through hole are disposed on the fifth flow channel. The second through hole is located between the first through hole and the third through hole. The first through hole is in communication with the indoor evaporator outlet interface. The third through hole is in communication with the reflux inlet interface. The temperature sensor is disposed on the base. A detection terminal of the temperature sensor passes through the second through hole and is located in the fifth flow channel.

In an embodiment, the base includes the first portion and the second portion. The first portion includes the first connecting surface. The second portion includes the second connecting surface. The first connecting surface is connected with the second connecting surface. The first connecting surface is recessed to form a fourth groove and a fifth groove. The second connecting surface and the fourth groove define the fourth flow channel. The second connecting surface and the fifth groove define the fifth flow channel.

The fourth switch valve is disposed on the first portion or the second portion.

In an embodiment, at least one of the fourth groove and the fifth groove includes a curved groove.

According to a second aspect of the present disclosure, a vehicle thermal management system is provided. The system includes the integrated valve module of the first aspect.

According to a third aspect of the present disclosure, a vehicle is provided, including the vehicle thermal management system of the second aspect.

According to the above technical solutions, since the first switch valve, the second switch valve, and the first expansion valve are all integrated on the base and are in communication with the first flow channel disposed/formed in the base, the inlet of the first expansion valve does not need to be connected to the outlet of the first switch valve and the outlet of the second switch valve through different pipelines. That is to say, in the present disclosure, the first flow channel formed in the base can replace the inlet of the first expansion valve for connecting the outlet of the first switch valve and the outlet of the second switch valve. The number of pipes and joints between the first switch valve and the second switch valve and the first expansion valve are reduced, and the complexity of the pipeline layout is reduced.

In addition, the indoor condenser outlet interface, the outdoor heat exchanger outlet interface, and the battery pack heat exchanger inlet interface are formed/disposed on the base. The first switch valve arranged/disposed on the base communicates between the indoor condenser outlet interface and the first flow channel. The second switch valve communicates between the outdoor heat exchanger outlet interface and the first flow channel. The first expansion valve is communicated between the first flow channel and the battery pack heat exchanger inlet interface. Therefore, during the assembly, it is only required to communicate the outlet of the indoor condenser with the indoor condenser outlet interface through the pipeline, communicate the outlet of the outdoor heat exchanger with the outdoor heat exchanger outlet interface through the pipeline, and communicate the refrigerant inlet of the battery pack heat exchanger with the battery pack heat exchanger inlet interface through the pipeline, to realize the connection between the indoor condenser, the outdoor heat exchanger, and the battery pack heat exchanger. The first switch valve, the second switch valve, and the first expansion valve are assembled between the indoor condenser, the outdoor heat exchanger, and the battery pack heat exchanger without complicated assembly through multiple connecting pipes. The assembly process is simple and convenient. In addition, the first expansion valve, the first switch valve, and the second switch valve are all arranged on the base, and form a module with the base, which can solve problems such as high space occupancy, and inconvenient assembly and maintenance caused by the scattered parts of the first expansion valve, the first switch valve, and the second switch valve in the vehicle.

Other features and advantages of the present disclosure are to be described in detail in the following detailed description part.

BRIEF DESCRIPTION OF THE DRAWINGS

The accompanying drawings are to provide further understanding of the present disclosure and constitute a part of this specification. The accompanying drawings and the implementations below are used together for explaining the present disclosure rather than constituting a limitation to the present disclosure. In the accompanying drawings.

DESCRIPTION OF REFERENCE NUMERALS

Figure 1:
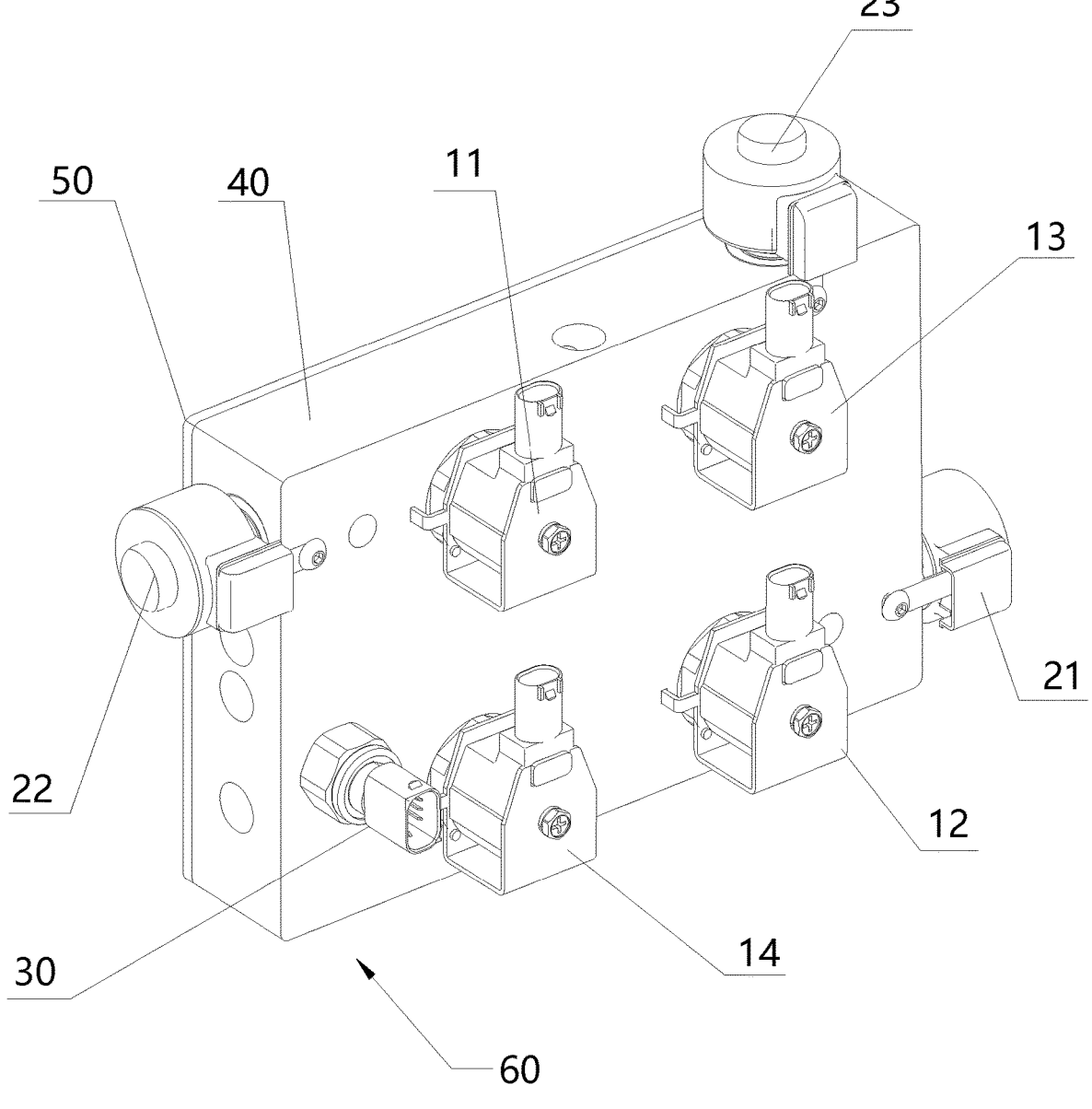
FIG. 1 is a three-dimensional view of an integrated valve module according to an implementation of the present disclosure.

11: First switch valve; 12: Second switch valve; 13: Third switch valve; 14: Fourth switch valve; 21: First expansion valve; 22: Second expansion valve; 23: Third expansion valve; 30: Temperature sensor; 111: First switch valve mounting hole; 112: First switch valve positioning hole; 121: Second switch valve mounting hole; 122: Second switch valve positioning hole; 131: Third switch valve mounting hole; 132: Third switch valve positioning hole; 141: Fourth switch valve mounting hole; 142: Fourth switch valve positioning hole; 211: First expansion valve mounting hole; 212: First expansion valve fastening hole; 221: Second expansion valve mounting hole; 222: Second expansion valve fastening hole; 231: Third expansion valve mounting hole; 232: Third expansion valve fastening hole; 61: Battery pack heat exchanger outlet interface; 62: Reflux inlet interface; 63: Indoor evaporator outlet interface; 64: Outdoor heat exchanger outlet interface; 65: Indoor evaporator inlet interface; 66: Outdoor heat exchanger inlet interface; 67: Indoor condenser outlet interface; 68: Battery pack heat exchanger inlet interface; 101: First flow channel; 102: Second flow channel; 103: Third flow channel; 104: Fourth flow channel; 105: Fifth flow channel; 701: First groove; 702: Second groove; 703: Third groove; 704: Fourth groove; 705: Fifth groove; 802: Second flow channel inlet; 804: Third flow channel outlet; 810: Fourth flow channel inlet; 803: First switch valve inlet interface; 808: First switch valve outlet interface; 809: Second switch valve inlet interface; 807: Second switch valve outlet interface; 801: Third switch valve inlet interface; 806: Third switch valve outlet interface; 811: Fourth switch valve inlet interface; 812: Fourth switch valve outlet interface; 819: First expansion valve inlet interface; 818: Second expansion valve inlet interface; 817: Third expansion valve inlet interface; 805: Third expansion valve outlet interface; 813: First through hole; 814: Second through hole; 815: Third through hole; 816: Fourth through hole; 60: Base; 40: First portion; 401: First connecting surface; 50: Second portion; 501: Second connecting surface; 91: Compressor; 92: Indoor condenser; 93: Outdoor heat exchanger; 94: Indoor evaporator; 95: Gas-liquid separator; 96: Battery pack heat exchanger; 97: Battery pack; 98: PTC air heater; and 99: PTC water heater.

DETAILED DESCRIPTION

Implementations of the present disclosure are described in detail below with reference to the accompanying drawings. It should be understood that the implementations described herein are merely used to describe and explain the present disclosure, but are not to limit the present disclosure.

In the present disclosure, in an absence of instructions to the contrary, the terms "first", "second" and the like are only used for distinguishing the description and are not to be understood as indicating or implying relative importance. In addition, in the description of the present disclosure, it should be noted that, unless otherwise specified or defined, the terms "arrangement", "communication", "connection", "installation" should be broadly understood, for example, may be fixed connection, may also be detachable connection or integrated connection, and may be direct connection or indirect connection. "Connected" can be two components directly connected or indirectly connected. A person of ordinary skill in the art may understand the meanings of the foregoing terms in the present disclosure according to situations.

Figure 6:
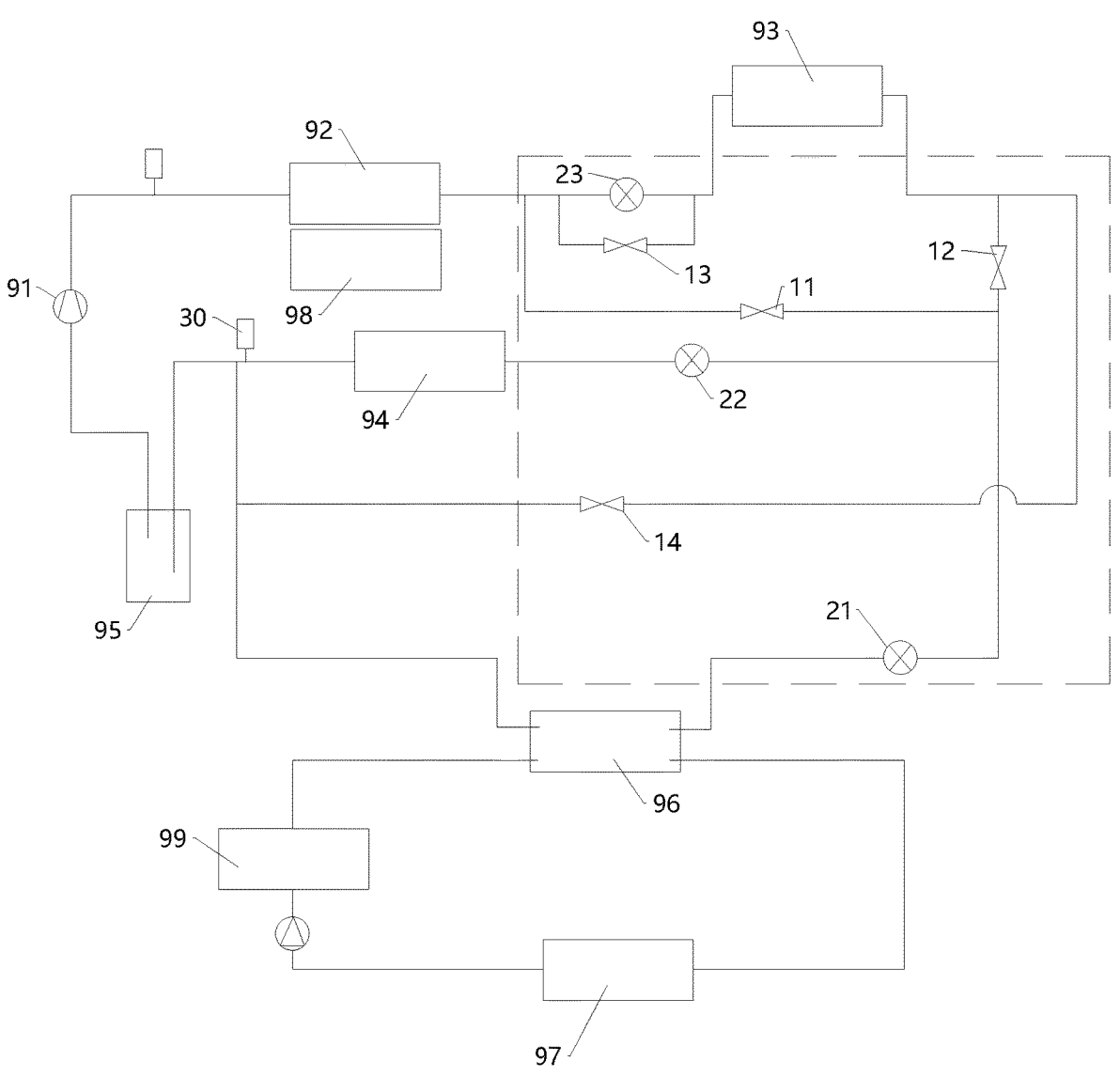
FIG. 6 is a schematic flow path diagram of a vehicle thermal management system according to an implementation of the present disclosure.

For a hybrid vehicle or a pure electric vehicle, the hybrid vehicle or the pure electric vehicle is equipped with a battery pack 97. To ensure that the battery pack 97 is within a proper operating temperature range, the battery pack 97 needs to be cooled when the temperature of the battery pack 97 is excessively high. As shown in FIG. 6, in order to cool of the battery pack 97 by using a cooling capacity of a refrigerant, a battery pack heat exchanger 96 in series with the battery pack 97 is arranged/disposed in a vehicle thermal management system according to the present disclosure. When the battery pack 97 is independently cooled, a high-temperature and high-pressure refrigerant flowing out of an outlet of a compressor 91 exudes heat to an outside atmosphere in an outdoor heat exchanger 93, and is throttled and depressurized through a first expansion valve 21, and then flows into the battery pack heat exchanger 96. In the battery pack heat exchanger 96, a low-temperature and low-pressure refrigerant absorbs heat of the high temperature coolant, so that a coolant outlet of the battery pack heat exchanger 96 flows out of the low temperature coolant. The low temperature cooling refrigerant can absorb the heat of the battery pack 97 when flowing through the battery pack 97, and realize the cooling of the battery pack 97.

For a conventional crew compartment heating mode, as shown in FIG. 6, the high-temperature and high-pressure refrigerant flowing out of the outlet of the compressor 91 is discharged into the crew compartment in the indoor condenser 92 to increase a temperature of the crew compartment. The exothermic refrigerant flowing out of the outlet of the indoor condenser 92 absorbs the heat of the outside atmosphere in the outdoor heat exchanger 93 and then returns to the compressor 91. However, when the temperature of the external environment is not much different from the temperature of the refrigerant in the outdoor heat exchanger 93, a heat absorption of the refrigerant in the outdoor heat exchanger 93 is limited, which will affect heating capacity of the crew compartment. In this case, since the battery pack 97 generates heat during operation, the vehicle thermal management system provided in the present disclosure also has a crew compartment heating mode that uses the heat of the battery pack 97. In an embodiment, as shown in FIG. 6, the refrigerant flowing out of the outlet of the indoor condenser 92 does not flow into the outdoor heat exchanger 93, but flows into the battery pack heat exchanger 96 after being throttled and depressurized by the first expansion valve 21, and absorbs the heat of the high temperature coolant in the battery pack heat exchanger 96, thereby transporting the heat generated by the battery pack 97 into an air conditioning system for heating the crew compartment.

Under different operating modes of the vehicle thermal management system, it is necessary to control the inlet of the first expansion valve 21 to be turned on with different devices. For example, in an independent cooling mode of the battery pack 97, the inlet of the first expansion valve 21 needs to be turned on with the outlet of the outdoor heat exchanger 93, while in the crew compartment heating mode using the heat of the battery pack 97, the inlet of the first expansion valve 21 needs to be turned on with the outlet of the indoor condenser 92. Therefore, a first switch valve 11 needs to be arranged/disposed between the outlet of indoor condenser 92 and the inlet of the first expansion valve 21, and a second switch valve 12 needs to be arranged/disposed between the outlet of the outdoor heat exchanger 93 and the inlet of the first expansion valve 21. However, an increase of the number of pipes and joints in the vehicle thermal management system is caused, resulting in a very complicated pipeline configuration, and the valves are scattered on the pipelines, which is not conducive to installation.

Figure 2:
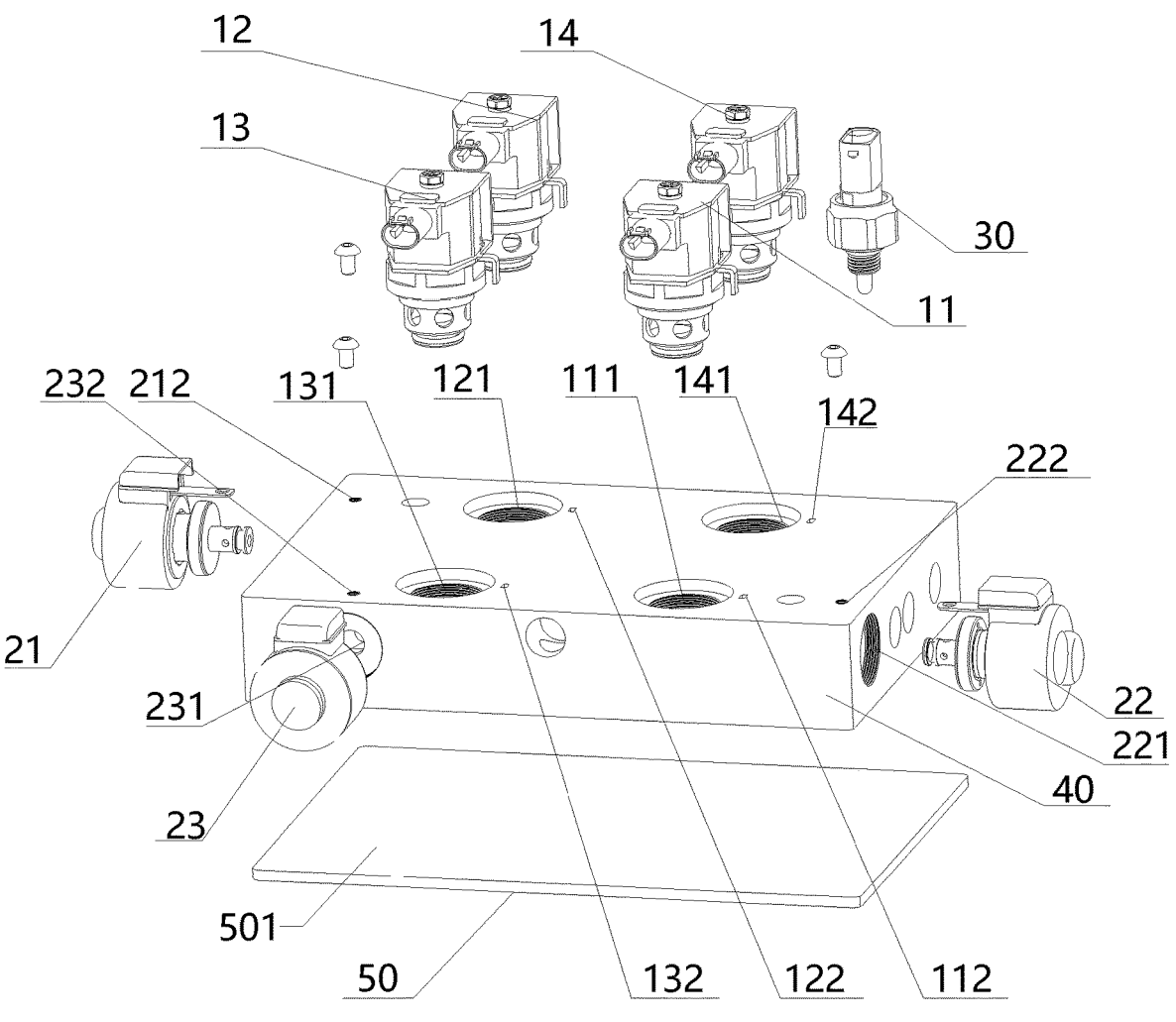
FIG. 2 is an exploded view of an integrated valve module according to an implementation of the present disclosure.
Figure 3:
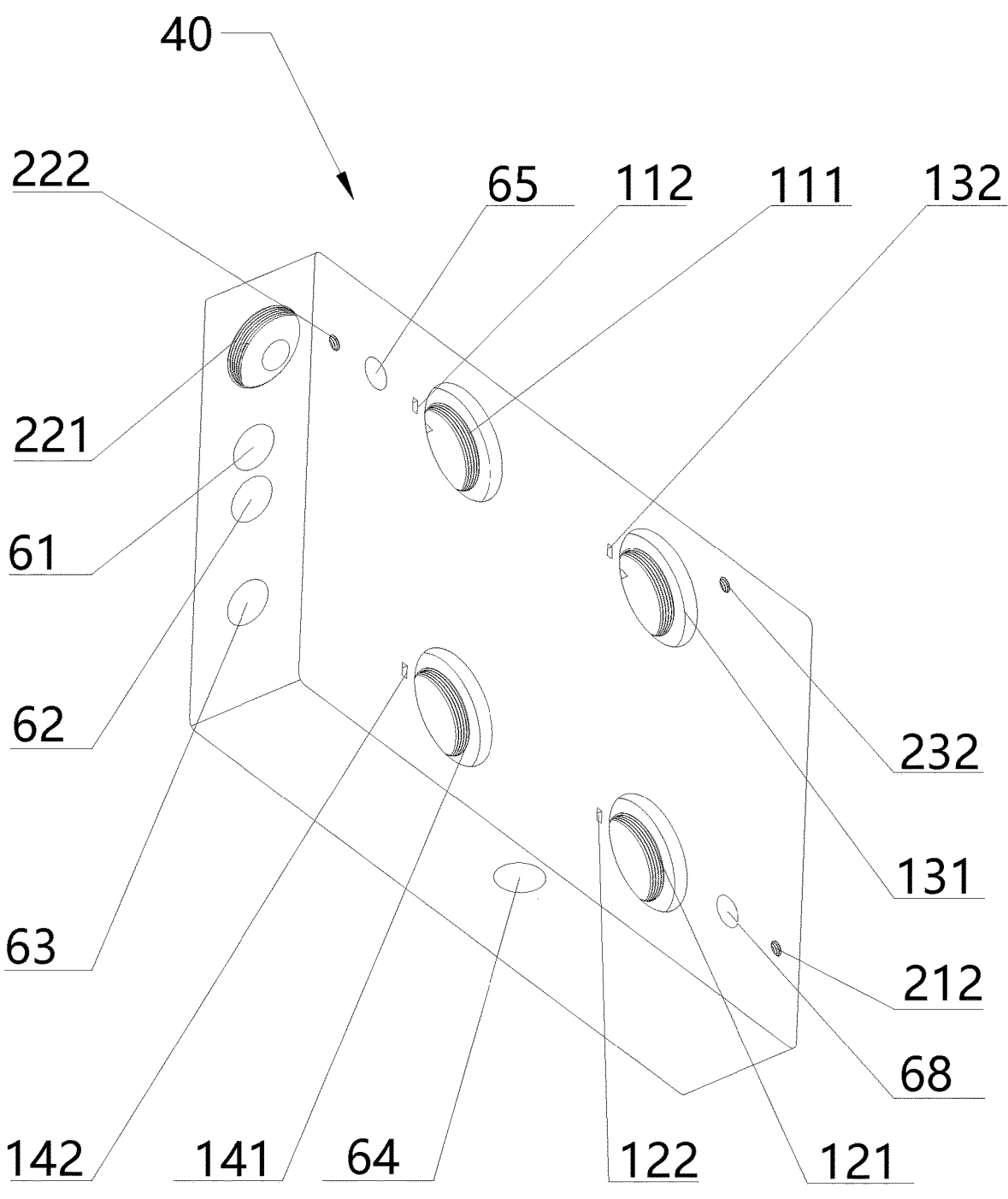
FIG. 3 is a three-dimensional view of a first portion of a base of an integrated valve module according to an implementation of the present disclosure.
Figure 4:
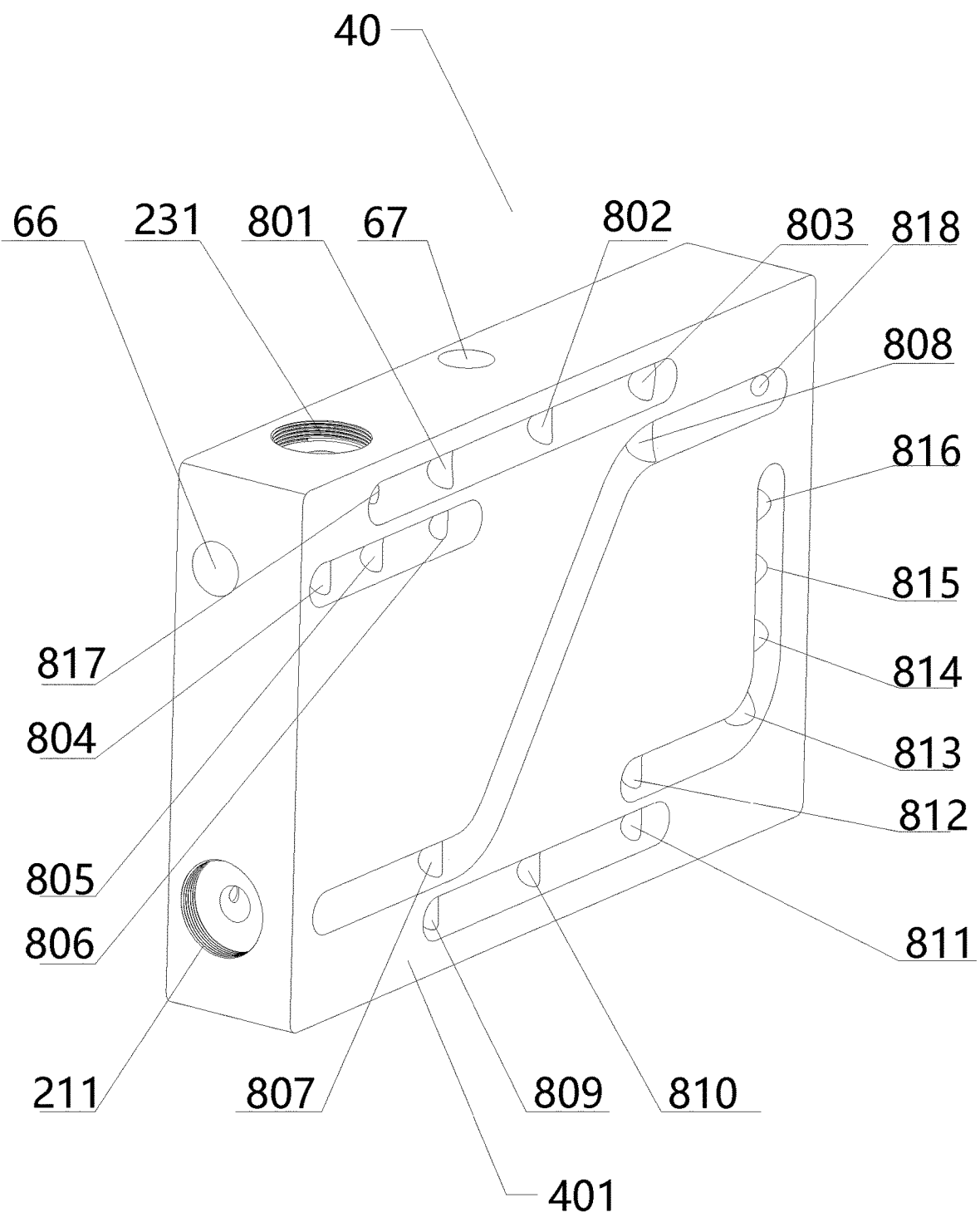
FIG. 4 is a three-dimensional view of a first portion of a base of an integrated valve module according to an implementation of the present disclosure (different viewing angles from FIG. 3).
Figure 5:
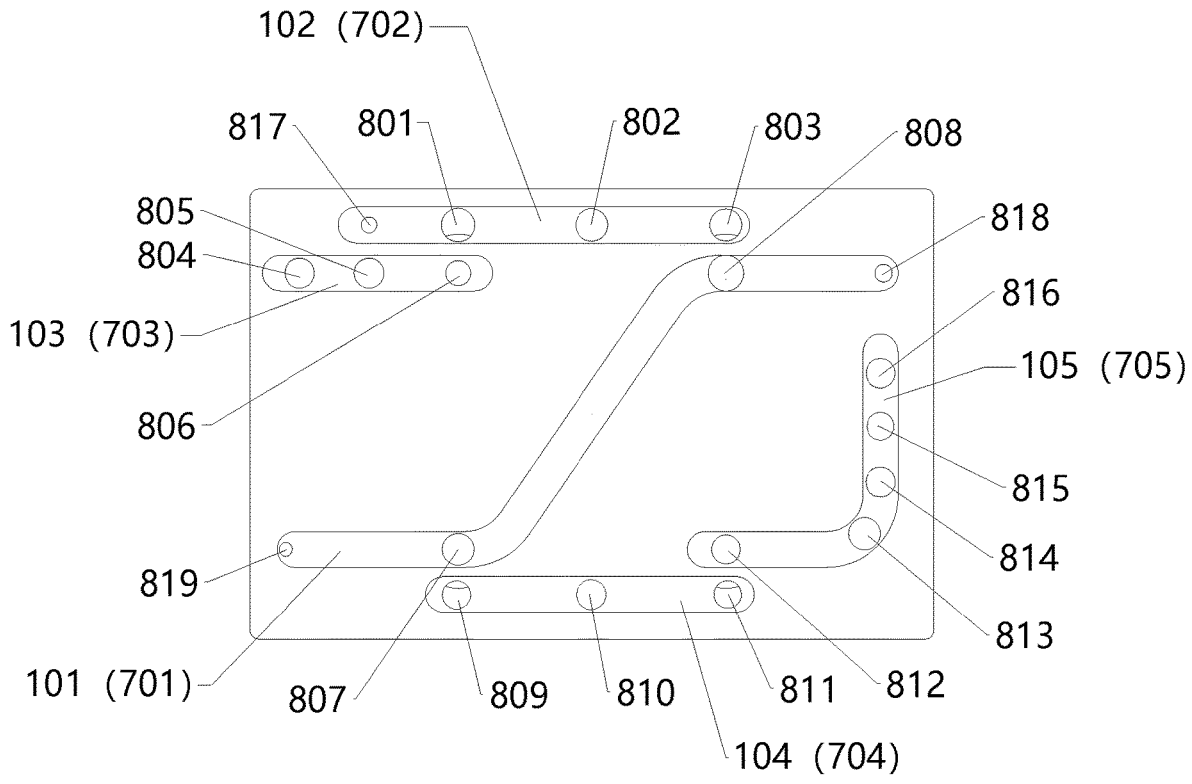
FIG. 5 is a front view of a first portion of a base of an integrated valve module according to an implementation of the present disclosure.

Therefore, in order to reduce complexity of pipeline configuration and the number of pipes and joints in the vehicle thermal management system, according to a first aspect of the present disclosure, an integrated valve module is provided, as shown in FIG. 1 to FIG. 7. The module includes a base 60 and a valve set arranged/disposed on the base 60. The valve set includes a first switch valve 11, a second switch valve 12, and a first expansion valve 21. As shown in FIG. 3 and FIG. 4, an indoor condenser outlet interface 67 configured to be connected with an outlet of an indoor condenser 92 outside the base 60, an outdoor heat exchanger outlet interface 64 configured to be connected with an outlet of an outdoor heat exchanger 93 outside the base 60, and a battery pack heat exchanger inlet interface 68 configured to be connected with a refrigerant inlet of a battery pack heat exchanger 96 outside the base 60 are formed on the base 60. As shown in FIG. 3 to FIG. 5, a first flow channel 101 is formed in the base 60. An inlet of the first switch valve 11 is in communication with the indoor condenser outlet interface. 67 An outlet of the first switch valve 11 is in communication with the first flow channel 101. An inlet of the first expansion valve 21 is in communication with the first flow channel 101. An outlet of the first expansion valve 21 is in communication with the battery pack heat exchanger inlet interface 68. The outdoor heat exchanger outlet interface 64 is in communication with an inlet of the second switch valve 12. An outlet of the second switch valve 12 is in communication with the first flow channel 101.

When the vehicle thermal management system is in the independent cooling mode of the battery pack 97, the second switch valve 12 is opened and the refrigerant can pass, the first switch valve 11 is closed and not allowing the refrigerant to pass through, and the first expansion valve 21 is opened and enabling the passage and throttling of the refrigerant. The high-temperature and high-pressure refrigerant flowing out of the outlet of the compressor 91 exotherms in the outdoor heat exchanger 93. The refrigerant flowing out of the outlet of the outdoor heat exchanger 93 flows into the second switch valve 12 through the outdoor heat exchanger outlet interface 64, and flows into the first flow channel 101 from the outlet of the second switch valve 12. The refrigerant in the first flow channel 101 is throttled and depressurized through the first expansion valve 21, and flows out from the battery pack heat exchanger inlet interface 68, and then flows into the battery pack heat exchanger 96 to cool the battery pack 97. In this mode, the first switch valve 11 communicating with the first flow channel 101 is closed, and the refrigerant in the first flow channel 101 cannot flow to the indoor condenser outlet interface 67 through the first switch valve 11. Therefore, the first switch valve 11 can function to prevent the refrigerant in the first flow channel 101 from flowing back into the indoor condenser 92.

When the vehicle thermal management system is in the crew compartment heating mode using the heat of the battery pack 97, the first switch valve 11 is opened and the refrigerant can pass, the second switch valve 12 is closed and not allowing the refrigerant to pass through, and the first expansion valve 21 is opened and enabling passage and throttling of the refrigerant. The high-temperature and high-pressure refrigerant flowing out of the outlet of the compressor 91 first flows into the indoor condenser 92, and exudes heat to the crew compartment in the indoor condenser 92 to increase the temperature of the crew compartment. The refrigerant flowing out of the outlet of the indoor condenser 92 flows into the first switch valve 11 through the indoor condenser outlet interface 67, and flows out from the outlet of the first switch valve 11 into the first flow channel 101. The refrigerant in the first flow channel 101 is throttled and depressurized through the first expansion valve 21, flows out from the battery pack heat exchanger inlet interface 68, and then flows into the battery pack heat exchanger 96, to absorb the heat of the battery pack 97 and finally return to the compressor 91. In this mode, the second switch valve 12 communicating with the first flow channel 101 is closed, and the refrigerant in the first flow channel 101 cannot flow to the outdoor heat exchanger outlet interface 64 through the second switch valve 12. Therefore, the second switch valve 12 can function to prevent the refrigerant in the first flow channel 101 from flowing back into the outdoor heat exchanger 93.

According to the above technical solutions, since the first switch valve 11, the second switch valve 12, and the first expansion valve 21 are all integrated on the base 60 and are in communication with the first flow channel 101 formed in the base 60, the inlet of the first expansion valve 21 does not need to be connected to the outlet of the first switch valve 11 and the outlet of the second switch valve 12 through different pipelines. That is to say, in the present disclosure, the first flow channel 101 formed in the base 60 can replace the inlet of the first expansion valve 21 for connecting the outlet of the first switch valve 11 and the outlet of the second switch valve 12. The number of pipes and joints between the first switch valve 11 and the second switch valve 12 and the first expansion valve 21 are reduced, and complexity of the pipeline layout is reduced.

In addition, the indoor condenser outlet interface 67, the outdoor heat exchanger outlet interface 64, and the battery pack heat exchanger inlet interface 68 are formed on the base 60. The first switch valve 11 arranged/disposed on the base 60 communicates between the indoor condenser outlet interface 67 and the first flow channel 101. The second switch valve 12 communicates between the outdoor heat exchanger outlet interface 64 and the first flow channel 101. The first expansion valve 21 is communicated between the first flow channel 101 and the battery pack heat exchanger inlet interface 68. Therefore, during assembly, it is only required to communicate the outlet of the indoor condenser 92 with the indoor condenser outlet interface 67 through the pipeline, communicate the outlet of the outdoor heat exchanger 93 with the outdoor heat exchanger outlet interface 64 through the pipeline, and communicate the refrigerant inlet of the battery pack heat exchanger 96 with the battery pack heat exchanger inlet interface 68 through the pipeline, to realize connection between the indoor condenser 92, the outdoor heat exchanger 93, and the battery pack heat exchanger 96. The first switch valve 11, the second switch valve 12, and the first expansion valve 21 are assembled between the indoor condenser 92, the outdoor heat exchanger 93, and the battery pack heat exchanger 96 without complicated assembly through multiple connecting pipes. The assembly process is simple and convenient. In addition, the first expansion valve 21, the first switch valve 11, and the second switch valve 12 are all arranged/disposed on the base 60, and form a module with the base 60, which can solve problems such as high space occupancy, and inconvenient assembly and maintenance caused by the scattered parts of the first expansion valve 21, the first switch valve 11, and the second switch valve 12 in the vehicle.

In an embodiment, to improve driving experience of a driver and passengers, the vehicle thermal management system can have a crew compartment cooling mode. As shown in FIG. 6, in the crew compartment cooling mode, the refrigerant flowing out of the outlet of the outdoor heat exchanger 93 is throttled and depressurized through the second expansion valve 22, and then flows into the indoor evaporator 94, absorbs the heat of the crew compartment in the indoor evaporator 94, and realizes the cooling of the crew compartment. The inlet of the second expansion valve 22 is also required to connect to the outlet of the outdoor heat exchanger 93. Therefore, in order to improve integration of the integrated valve module provided by the present disclosure, the second expansion valve 22 may be integrated. In an embodiment, as shown in FIG. 1 and FIG. 2, the valve set may further include a second expansion valve 22. As shown in FIG. 3, an indoor evaporator inlet interface 65 configured to be connected with an inlet of an indoor evaporator 94 outside the base 60 being formed on the base 60, an inlet of the second expansion valve 22 being in communication with the first flow channel 101, and an outlet of the second expansion valve 22 being in communication with the indoor evaporator inlet interface 65. In this way, the first flow channel 101 may replace the inlet of the first expansion valve 21 for connecting multiple external pipes of the outlet of the first switch valve 11 and the outlet of the second switch valve 12, and may also replace the inlet of the second expansion valve 22 for connecting multiple external pipes of the outlet of the first switch valve 11 and the outlet of the second switch valve 12, so that the integrated valve module provided by the present disclosure is more integrated.

When the crew compartment is cooled, the second switch valve 12 is opened, the second expansion valve 22 is opened, and the first switch valve 11 is closed. The refrigerant flowing out of the outlet of the outdoor heat exchanger 93 flows into the second switch valve 12 through the outdoor heat exchanger outlet interface 64, and flows into the first flow channel 101 from the outlet of the second switch valve 12. The refrigerant in the first flow channel 101 is throttled and depressurized through the second expansion valve 22 and then flows out through the indoor evaporator inlet interface 65, and flows into the indoor evaporator 94. In the case that the crew compartment is cooled, since the first switch valve 11 is closed, the refrigerant in the first flow channel 101 does not flow back into the indoor condenser 92 through the first switch valve 11. When the crew compartment is cooled, if the battery pack 97 has a cooling requirement, the first expansion valve 21 can also be opened. In this way, the refrigerant in the first flow channel 101 can be divided into two parts, with one of the two parts flowing to the battery pack heat exchanger 96 through the first expansion valve 21, and the other of the two parts flowing to the indoor evaporator 94 through the second expansion valve 22.

In addition, in the case that the crew compartment is cooled, as shown in FIG. 6, the refrigerant flowing out of the outlet of the compressor 91 first flows into the indoor condenser 92. In this case, since the air is not blown to the indoor condenser 92 through a fan or a blower, the refrigerant does not release heat to the crew compartment in the indoor condenser 92. That is to say, the indoor condenser 92 is configured as a through flow channel, and the refrigerant flowing out of the outlet of the indoor condenser 92 needs to enter the outdoor heat exchanger 93 to release heat. Therefore, the outlet of the indoor condenser 92 can be connected to the inlet of the outdoor heat exchanger 93 through the third switch valve 13.

In order to integrate the third switch valve 13 into the integrated valve module, and further reduce the number of connecting pipes and joints between the outlet of the indoor condenser 92 and the inlet of the third switch valve 13 and the inlet of the first switch valve 11, in an embodiment, the valve set further includes the third switch valve 13. As shown in FIG. 4 and FIG. 5, an outdoor heat exchanger inlet interface 66 connected with an inlet of the outdoor heat exchanger 93 is further formed on the base 60. A second flow channel 102 is further formed in the base 60, the indoor condenser outlet interface 67 being in communication with the second flow channel 102, the inlet of the first switch valve 11 being in communication with the second flow channel 102, an inlet of the third switch valve 13 being in communication with the second flow channel 102, and an outlet of the third switch valve 13 being in communication with the outdoor heat exchanger inlet interface 66.

In this way, through turn-on or turn-off of the first switch valve 11 and turn-on or turn-off of the third switch valve 13, a refrigerant flowing into the second flow channel 102 through the indoor condenser outlet interface 67 is caused to flow into the first flow channel 101 through the first switch valve 11, or flow out from the outdoor heat exchanger inlet interface 66 through the third switch valve 13. In other words, the refrigerant flowing out of the outlet of the indoor condenser 92 may enter the second flow channel 102 through the indoor condenser outlet interface 67. If the first switch valve 11 is opened in this case, the refrigerant in the second flow channel 102 may flow into the first flow channel 101 through the first switch valve 11, and may further flow into the battery pack heat exchanger 96 through the first expansion valve 21 and/or into the indoor evaporator 94 through the second expansion valve 22. If the third switch valve 13 is opened, the refrigerant in the second flow channel 102 may flow out from the outdoor heat exchanger inlet interface 66 via the third switch valve 13, and may further flow into the outdoor heat exchanger 93.

The inlet of the third switch valve 13 and the inlet of the first switch valve 11 are both in communication with the second flow channel 102 formed in the base 60, and the second flow channel 102 is further in communication with the indoor condenser outlet interface 67 for connecting with the outlet of the indoor condenser 92. Therefore, the second flow channel 102 in the base 60 corresponds to replacing the multiple pipes and joints connected between the outlet of the indoor condenser 92 and the inlet of the first switch valve 11 and the inlet of the third switch valve 13, which further improve integration of the integrated valve module and simplifying complexity of the pipeline configuration of the vehicle thermal management system.

In the vehicle thermal management system, for the conventional crew compartment heating mode, the refrigerant released in the indoor condenser 92 needs to pass through the third expansion valve 23 to throttle and reduce pressure and then enter the outdoor heat exchanger 93 to absorb the heat of the outside atmosphere. The third expansion valve 23 and the third switch valve 13 are connected in parallel with each other between the indoor condenser 92 and the outdoor heat exchanger 93. To integrate the third expansion valve 23, In an embodiment, the valve set further includes a third expansion valve 23. As shown in FIG. 4 and FIG. 5, a third flow channel 103 may also be formed in the base 60, the outdoor heat exchanger inlet interface 66 is in communication with the third flow channel 103, and the outlet of the third switch valve 13 is in communication with the third flow channel 103, so as to communicate with the outdoor heat exchanger inlet interface 66 through the third flow channel 103. The inlet of the third expansion valve 23 is in communication with the second flow channel 102, and the outlet of the third expansion valve 23 is in communication with the third flow channel 103, so as to communicate with the outdoor heat exchanger inlet interface 66 through the third flow channel 103.

In this way, through turn-on or turn-off of the third switch valve 13 and throttling or turn-off of the third expansion valve 23, a refrigerant flowing into the second flow channel 102 through the indoor condenser outlet interface 67 is caused to flow into the third flow channel 103 through the third switch valve 13, or flow into the third flow channel 103 through the third expansion valve 23. As a result, the refrigerant flowing out of the outlet of the indoor condenser 92 may be throttled and depressurized through the third expansion valve 23 and then selectively flow into the outdoor heat exchanger 93, or directly flow into the outdoor heat exchanger 93 without being throttled and affected through the third switch valve 13. Here, it should be noted that the first expansion valve 21, the second expansion valve 22, and the third expansion valve 23 are valves that can realize throttling and depressurizing. Therefore, in the present disclosure, the throttling or turn-off of the expansion valve can be understood as opening or closing of the expansion valve. When the expansion valve is opened, the refrigerant can flow through the expansion valve and be throttled and depressurized by the expansion valve, but when the expansion valve is closed, the refrigerant cannot flow through the expansion valve.

Since the second flow channel 102 is in communication with the indoor condenser outlet interface 67, the inlet of the first switch valve 11, the inlet of the third expansion valve 23, and the inlet of the third switch valve 13 are in communication with the second flow channel 102, the second flow channel 102 corresponds to replacing the multiple pipes and joints connected between the outlet of the indoor condenser 92 and the inlet of the first switch valve 11, the inlet of the third switch valve 13, and the inlet of the third expansion valve 23, further reducing the number of pipes in the vehicle thermal management system. While the third flow channel 103 is in communication with the outdoor heat exchanger inlet interface 66, and the outlet of the third switch valve 13 and the outlet of the third expansion valve 23 are in communication with the third flow channel 103, the third flow channel 103 corresponds to replacing the multiple pipes connected between the outlet of the third switch valve 13 and the outlet of the third expansion valve 23 and the inlet of the outdoor heat exchanger 93, thereby reducing the number of pipes in the vehicle thermal management system.

In addition, for a conventional crew compartment heating mode, the refrigerant flowing out of the outlet of the outdoor heat exchanger 93 directly flows into the inlet of the compressor 91 or first passes through the gas-liquid separator 95 and then flows into the inlet of the compressor 91. The third switch valve 13 is arranged/disposed between the outlet of the outdoor heat exchanger 93 and the inlet of the compressor 91 or the inlet of the gas-liquid separator 95 connected to the compressor 91. Since the inlet of the third switch valve 13 and the inlet of the first switch valve 11 are both connected to the outlet of the outdoor heat exchanger 93, to integrate the third switch valve 13, In an embodiment, the valve set further includes a fourth switch valve 14. As shown in FIG. 3, a reflux inlet interface 62 configured to be connected with an inlet of a compressor 91 outside the base 60 or an inlet of a gas-liquid separator 95 connected to the compressor is formed on the base 60. A fourth flow channel 104 is further formed in the base 60, the outdoor heat exchanger outlet interface 64 being in communication with the fourth flow channel 104, the inlet of the second switch valve 12 being in communication with the fourth flow channel 104, an inlet of the fourth switch valve 14 being in communication with the fourth flow channel 104, and an outlet of the fourth switch valve 14 being in communication with the reflux inlet interface 62.

Since the fourth flow channel 104 is in communication with the outdoor heat exchanger outlet interface 64, and the inlet of the second switch valve 12 and the inlet of the fourth switch valve 14 are in communication with the fourth flow channel 104, the fourth flow channel 104 in the base 60 replaces the multiple pipes connected between the outlet of the outdoor heat exchanger 93 and the inlet of the second switch valve 12 and the inlet of the fourth switch valve 14, further reducing the number of pipes in the vehicle thermal management system.

As shown in FIG. 6, the refrigerant flowing out of the refrigerant outlet of the battery pack heat exchanger 96 also needs to flow into the inlet of the compressor 91 or first pass through the gas-liquid separator 95 and then flow into the inlet of the compressor 91. In order to reduce the number of connecting pipes between the refrigerant outlet of the battery pack heat exchanger 96 and the outlet of the fourth switch valve 14 and the compressor 91 or the gas-liquid separator 95, in an implementation of the present disclosure, as shown in FIG. 4 and FIG. 5, a fifth flow channel 105 is further formed in the base 60, an outlet of the fourth switch valve 14 being in communication with the fifth flow channel 105, the reflux inlet interface 62 is in communication with the fifth flow channel 105. A battery pack heat exchanger outlet interface 61 configured to be connected with a refrigerant outlet of the battery pack heat exchanger 96 is further formed on the base 60, and the battery pack heat exchanger outlet interface 61 being in communication with the fifth flow channel 105. In this way, whether the refrigerant flowing out of the refrigerant outlet of the battery pack heat exchanger 96 or the refrigerant flowing out of the outlet of the fourth switch valve 14 can flow into the fifth flow channel 105, and then flow into the compressor 91 or the gas-liquid separator 95 connected to the compressor 91 through the reflux inlet interface 62.

In addition, the refrigerant flowing out of the outlet of the indoor evaporator 94 also needs to flow into the inlet of the compressor 91 or flow into the inlet of the compressor 91 after passing through the gas-liquid separator 95. In an embodiment, As shown in FIG. 3 and FIG. 5, an indoor evaporator outlet interface 63 configured to be connected with an outlet of the indoor evaporator 94 is further formed on the base 60, and the indoor evaporator outlet interface 63 is in communication with the fifth flow channel 105. In this way, the refrigerant flowing out of the outlet of the indoor evaporator 94 may also flow into the compressor 91 or the gas-liquid separator 95 connected to the compressor 91 through the fifth flow channel 105 and the reflux inlet interface 62 communicated with the fifth flow channel 105.

To facilitate detection of a temperature of the refrigerant flowing out of the outlet of the indoor evaporator 94, the temperature sensor 30 may also be integrated in the integrated valve module. In an implementation, as shown in FIG. 1, FIG. 2, and FIG. 5, the integrated valve module further includes a temperature sensor 30, a first through hole 813, a second through hole 814, and a third through hole 815 being formed on the fifth flow channel 105, the second through hole 814 being located between the first through hole 813 and the third through hole 815, the first through hole 813 being in communication with the indoor evaporator outlet interface 63, the third through hole 815 being in communication with the reflux inlet interface 62, and the temperature sensor 30 being arranged/disposed on the base 60 and a detection terminal of the temperature sensor 30 passing through the second through hole 814 and being located in a fourth sub-flow channel. The refrigerant flowing out from the outlet of the indoor evaporator 94 flows into the fifth flow channel 105 through the indoor evaporator outlet interface 63 and the first through hole 813, and flows towards the third through hole 815 in the fifth flow channel 105, so as to flow into the inlet of the compressor 91 or the inlet of the gas-liquid separator 95 through the reflux inlet interface 62 communicating with the third through hole 815. Since the detection terminal of the temperature sensor 30 is located between the first through hole 813 and the second through hole 814, the refrigerant flowing out from the outlet of the indoor evaporator 94 passes through the detection terminal of the temperature sensor 30 when flowing in the fifth flow channel 105, so that the temperature sensor 30 can detect the temperature of the refrigerant in the fifth flow channel 105.

In an embodiment, as shown in FIG. 4 and FIG. 5, a fourth through hole 816 may be formed on the fifth flow channel 105. The fourth through hole 816 is configured to communicate with the battery pack heat exchanger outlet interface 61.

In an embodiment, as shown in FIG. 5, a first switch valve outlet interface 808, a second switch valve outlet interface 807, a first expansion valve inlet interface 819, and a second expansion valve inlet interface 818 may be formed on the first flow channel 101. The first switch valve outlet interface 808 may be in indirect communication with the outlet of the first switch valve 11 through a first transition flow channel, or may be directly connected to the outlet of the first switch valve 11 without passing through the transition flow channel. The second switch valve outlet interface 807 may be in indirect communication with the outlet of the second switch valve 12 through a second transition flow channel, or may be directly connected to the outlet of the second switch valve 12 without passing through the transition flow channel. The first expansion valve inlet interface 819 may be in indirect communication with the outlet of the first expansion valve 21 through a third transition flow channel, or directly fitted to the inlet of the first expansion valve 21 without passing through the transition flow channel. The outlet of the first expansion valve 21 may be in indirect communication with the battery pack heat exchanger inlet interface 68 through the fourth transition channel, or may be directly docked with the battery pack heat exchanger inlet interface 68 without passing through the transition flow channel. The second expansion valve inlet interface 818 may be in indirect communication with the outlet of the second expansion valve 22 through a fifth transition flow channel, or directly fitted to the inlet of the second expansion valve 22 without passing through the transition flow channel. The outlet of the second expansion valve 22 may be in indirect communication with the indoor evaporator inlet interface 65 through a sixth transition channel, or may be directly fitted to the indoor evaporator inlet interface 65 without passing through the transition flow channel.

In an embodiment, as shown in FIG. 5, a first switch valve inlet interface 803, a third switch valve inlet interface 801, a third expansion valve inlet interface 817, and a second flow channel inlet 802 may be formed on the second flow channel 102. The first switch valve inlet interface 803 may be in indirect communication with the inlet of the first switch valve 11 through a seventh transition flow channel, or may be directly connected to the inlet of the first switch valve 11 without passing through the transition flow channel. The third switch valve inlet interface 801 may be in indirect communication with the inlet of the third switch valve 13 through an eighth transition flow channel, or may be directly connected to the inlet of the third switch valve 13 without passing through the transition flow channel. The third expansion valve inlet interface 817 may be in indirect communication with the inlet of the third expansion valve 23 through a ninth transition flow channel, or may be directly fitted to the inlet of the third expansion valve 23 without passing through the transition flow channel. The second flow channel inlet 802 may be in indirect communication with the indoor condenser outlet interface 67 through a tenth transition flow channel.

In an embodiment, as shown in FIG. 5, a third switch valve outlet interface 806, a third expansion valve outlet interface 805, and a third flow channel outlet 804 may be formed on the third flow channel 103. The third switch valve outlet interface 806 may be in indirect communication with the outlet of the third switch valve 13 through an eleventh transition flow channel, or may be directly connected to the outlet of the third switch valve 13 without passing through the transition flow channel. The third expansion valve outlet interface 805 may be in indirect communication with the outlet of the third expansion valve 23 through a twelfth transition flow channel, or may be directly fitted to the outlet of the third expansion valve 23 without passing through the transition flow channel. The outdoor heat exchanger inlet interface 66 may be in indirect communication with the third flow channel outlet 804 through a thirteenth transition flow channel.

In an embodiment, as shown in FIG. 5, a second switch valve inlet interface 809, a fourth switch valve inlet interface 811, and a fourth flow channel inlet 810 may be formed on the fourth flow channel 104. The second switch valve inlet interface 809 may be in indirect communication with the inlet of the second switch valve 12 through a fourteenth transition flow channel, or may be directly connected to the inlet of the second switch valve 12 without passing through the transition flow channel. The fourth switch valve inlet interface 811 may be in indirect communication with the inlet of the fourth switch valve 14 through a fifteenth transition flow channel, or may be directly connected to the inlet of the fourth switch valve 14 without passing through the transition flow channel. The outdoor heat exchanger outlet interface 64 may be in communication with the fourth flow channel inlet 810 through a sixteenth transition flow channel.

In an embodiment, as shown in FIG. 5, a fourth switch valve outlet interface 812 may be formed on the fifth flow channel 105. The fourth switch valve outlet interface 812 may be in indirect communication with the outlet of the fourth switch valve 14 through a seventeenth transition flow channel, or may be directly connected to the outlet of the fourth switch valve 14 without passing through the transition flow channel.

As mentioned above, the first flow channel 101, the second flow channel 102, the third flow channel 103, the fourth flow channel 104 and the fifth flow channel 105 are formed in the base 60. The base 60 may have any proper structure and shape, and be fabricated and formed in any proper manner by the first flow channel 101, the second flow channel 102, the third flow channel 103, the fourth flow channel 104, and the fifth flow channel 105. For example, in an implementation, the base 60 may be integrally formed by means of, for example, watering by using a molding mold, to form a first flow channel 101, a second flow channel 102, a third flow channel 103, a fourth flow channel 104, and a fifth flow channel 105 during the molding process.

In another implementation, the base 60 may be a portion structure. As shown in FIG. 2 and FIG. 4, the base 60 includes the first portion 40 and the second portion 50. The first portion 40 includes the first connecting surface 401. The second portion 50 includes the second connecting surface 501. The first connecting surface 401 is hermetically connected with the second connecting surface 501. The first connecting surface 401 is inwardly recessed to form a first groove 701, a second groove 702, a third groove 703, a fourth groove 704, and a fifth groove 705. The second connecting surface 501 and the first groove 701 jointly define the first flow channel 101. The second connecting surface 501 and the second groove 702 jointly define the second flow channel 102. The second connecting surface 501 and the third groove 703 jointly define the third flow channel 103. The second connecting surface 501 and the fourth groove 704 jointly define the fourth flow channel 104. The second connecting surface 501 and the fifth groove 705 jointly define the fifth flow channel 105. The first switch valve 11, the second switch valve 12, the third switch valve 13, the fourth switch valve 14, the first expansion valve 21, the second expansion valve 22, and the third expansion valve 23 are all arranged/disposed on the first portion 40. In an embodiment, the first switch valve 11, the second switch valve 12, the third switch valve 13, the fourth switch valve 14, the first expansion valve 21, the second expansion valve 22, and the third expansion valve 23 are all arranged/disposed on the second portion 50. That is to say, the first switch valve 11, the second switch valve 12, the third switch valve 13, the first expansion valve 21, the second expansion valve 22 and the third expansion valve 23 may be located on a same portion as the first groove 701, the second groove 702, the third groove 703, the fourth groove 704, and the fourth groove 704, or may be located on different portions, which is not limited in the present disclosure.

The base 60 includes the first portion 40 and the second portion 50 that fit with each other. The first groove 701, the second groove 702, the third groove 703, the fourth groove 704, and the fifth groove 705 are provided on a surface of the first portion 40. The first flow channel 101, the second flow channel 102, the third flow channel 103, the fourth flow channel 104, and the fifth flow channel 105 are formed by the cooperation between the first portion 40 and the second portion 50. In this way, the following advantage is achieved. The manufacturing process of providing the first groove 701, the second groove 702, the third groove 703, the fourth groove 704, and the fifth groove 705 on the surface of the first portion 40 is simple, which can facilitate the formation and manufacture of the flow channel, especially a curved flow channel.

In an embodiment, at least one of the first groove 701, second groove 702, and the third groove 703 is a curved groove, and at least one of the fourth groove 704 and the fifth groove 705 is a curved groove.

For an embodiment of the curved groove is formed in the first groove 701, the second groove 702, the third groove 703, the fourth groove 704, and the fifth groove 705, an angle of a corner of the curved groove may be greater than or equal to 90° to reduce a flow resistance of the refrigerant flowing in the curved flow channel.

In addition, the indoor condenser outlet interface 67, the outdoor heat exchanger inlet interface 66, the outdoor heat exchanger outlet interface 64, the indoor evaporator inlet interface 65, the reflux inlet interface 62, the battery pack heat exchanger outlet interface 61, and another interface are arranged/disposed on an outer surface of the base 60. Therefore, the first groove 701, the second groove 702, the third groove 703, the fourth groove 704, and the fifth groove 705 are arranged/disposed on the first portion 40 may facilitate communication with the interface located on the surface and the corresponding sub-flow channel. In an embodiment, for example, for the fourth flow channel 104 and the outdoor heat exchanger outlet interface 64 in communication with the fourth flow channel 104, a straight-line cavity may be drawn from a wall of the third groove 703 to an outer surface of the first portion 40, after the fourth groove 704 is provided on the first portion 40. As a result, the fourth flow channel inlet 810, the outdoor heat exchanger outlet interface 64, and the transition flow channel communicating between the fourth flow channel inlet 810 and the outdoor heat exchanger outlet interface 64 are formed. The communication manner of another interface and the corresponding sub-flow channel is similar to the communication manner of the outdoor heat exchanger outlet interface 64 and the fourth flow channel 104, which is not repeated here.

In addition, the first switch valve 11 and the second switch valve 12 may be mounted at any proper position on the base 60. In an implementation, referring to FIG. 1 to FIG. 5, an axis of a valve core of the first switch valve 11 may be perpendicular to a plane where the first flow channel 101 is located and a plane where the second flow channel 102 is located. An axis of a valve core of the second switch valve 12 is perpendicular to a plane where the first flow channel 101 is located and a plane where the fourth flow channel 104 is located. An axis of a valve core of the third switch valve 13 is perpendicular to a plane where the first flow channel 101 is located and a plane where the third flow channel 103 is located. An axis of a valve core of the fourth switch valve 14 is perpendicular to a plane where the fourth flow channel 104 is located and a plane where the fifth flow channel 105 is located. In this way, deposition of impurities is prevented from in the first switch valve 11, the second switch valve 12, the third switch valve 13 and the fourth switch valve 14. The plane where the flow channel is located refers to a plane defined by a longitudinal direction and a width direction of the base 60 as shown in FIG. 5.

In an embodiment provided in the present disclosure, as shown in FIG. 2 to FIG. 4, the first portion 40 may be formed in a shape of a cube, and has two large surfaces defined by a length and a width of the first portion 40, and four narrow surfaces defined by a length and a thickness of the first portion 40 and a width and a thickness of the first portion 40. The first groove 701, the second groove 702, the third groove 703, the fourth groove 704, and the fifth groove 705 may be formed on one large surface. The first switch valve 11, the second switch valve 12, the third switch valve 13, and the fourth switch valve 14 may be mounted to another large surface. As a result, the axis of the valve core of the first switch valve 11 may be perpendicular to the plane where the first flow channel 101 is located and the plane where the second flow channel 102 is located, the axis of the valve core of the second switch valve 12 is perpendicular to the plane where the first flow channel 101 is located and the plane where the fourth flow channel 104 is located, the axis of the valve core of the third switch valve 13 is perpendicular to the plane where the first flow channel 101 is located and the plane where the third flow channel 103 is located, and the axis of the valve core of the fourth switch valve 14 is perpendicular to the plane where the fourth flow channel 104 is located and the plane where the fifth flow channel 105 is located. While the first expansion valve 21, the second expansion valve 22, and the third expansion valve 23 may be mounted to the narrow surfaces, so that the first expansion valve 21, the second expansion valve 22, and the third expansion valve 23 are connected to their corresponding flow channels and interfaces. In an embodiment, the first expansion valve 21, the second expansion valve 22, and the third expansion valve 23 may be mounted to different narrow surfaces.

The first switch valve 11, the second switch valve 12, the third switch valve 13, the fourth switch valve 14, the first expansion valve 21, the second expansion valve 22, the third expansion valve 23, and the temperature sensor 30 may be mounted to the base 60 in any proper mounting manner. For example, as shown in FIG. 2 to FIG. 4, In an implementation provided in the present disclosure, a first expansion valve mounting hole 211, a second expansion valve mounting hole 221, a third expansion valve mounting hole 231, a first switch valve mounting hole 111, a second switch valve mounting hole 121, a third switch valve mounting hole 131, a fourth switch valve mounting hole 141, and a temperature sensor mounting hole may be formed on the base 60. Internal threads may be formed on hole walls of the first expansion valve mounting hole 211, the second expansion valve mounting hole 221, the third expansion valve mounting hole 231, the first switch valve mounting hole 111, the second switch valve mounting hole 121, the third switch valve mounting hole 131, the fourth switch valve mounting hole 141, and the temperature sensor mounting hole. As a result, the first switch valve 11, the second switch valve 12, the third switch valve 13, the fourth switch valve 14, the first expansion valve 21, the second expansion valve 22, the third expansion valve 23, and the temperature sensor 30 are respectively connected to the first switch valve mounting hole 111, the second switch valve mounting hole 121, the third switch valve mounting hole 131, the fourth switch valve mounting hole 141, the first expansion valve mounting hole 211, the second expansion valve mounting hole 221, the third expansion valve mounting hole 231, and the temperature sensor mounting hole through a threaded connection.

In addition, to further improve fixability of the first expansion valve 21, the second expansion valve 22, and the third expansion valve 23, as shown in FIG. 2 and FIG. 3, a first expansion valve fastening hole 212, a second expansion valve fastening hole 222, and a third expansion valve fastening hole 232 may be formed on the base 60. A first bolt may pass through a mounting plate on the first expansion valve 21 and be threaded and connected to the first expansion valve fastening hole 212. A second bolt may pass through a mounting plate on the second expansion valve 22 and be threaded and connected to the second expansion valve fastening hole 222. A third bolt may pass through a mounting plate on the third expansion valve 23 and be threaded and connected to the third expansion valve fastening hole 232.

In an embodiment, to facilitate positioning and assembly of the first switch valve 11, the second switch valve 12, the third switch valve 13, and the fourth switch valve 14, as shown in FIG. 3, a first switch valve positioning hole 112, a second switch valve positioning hole 122, a third switch valve positioning hole 132, and a fourth switch valve positioning hole 142 may be formed on the base 60. The first switch valve positioning hole 112 is configured to fit with the positioning plate on the first switch valve 11. The second switch valve positioning hole 122 is configured to fit with the positioning plate on the second switch valve 12. The third switch valve positioning hole 132 is configured to fit with the positioning plate on the third switch valve 13. The fourth switch valve positioning hole 142 is configured to fit with the positioning plate on the fourth switch valve 14.

Figure 7:
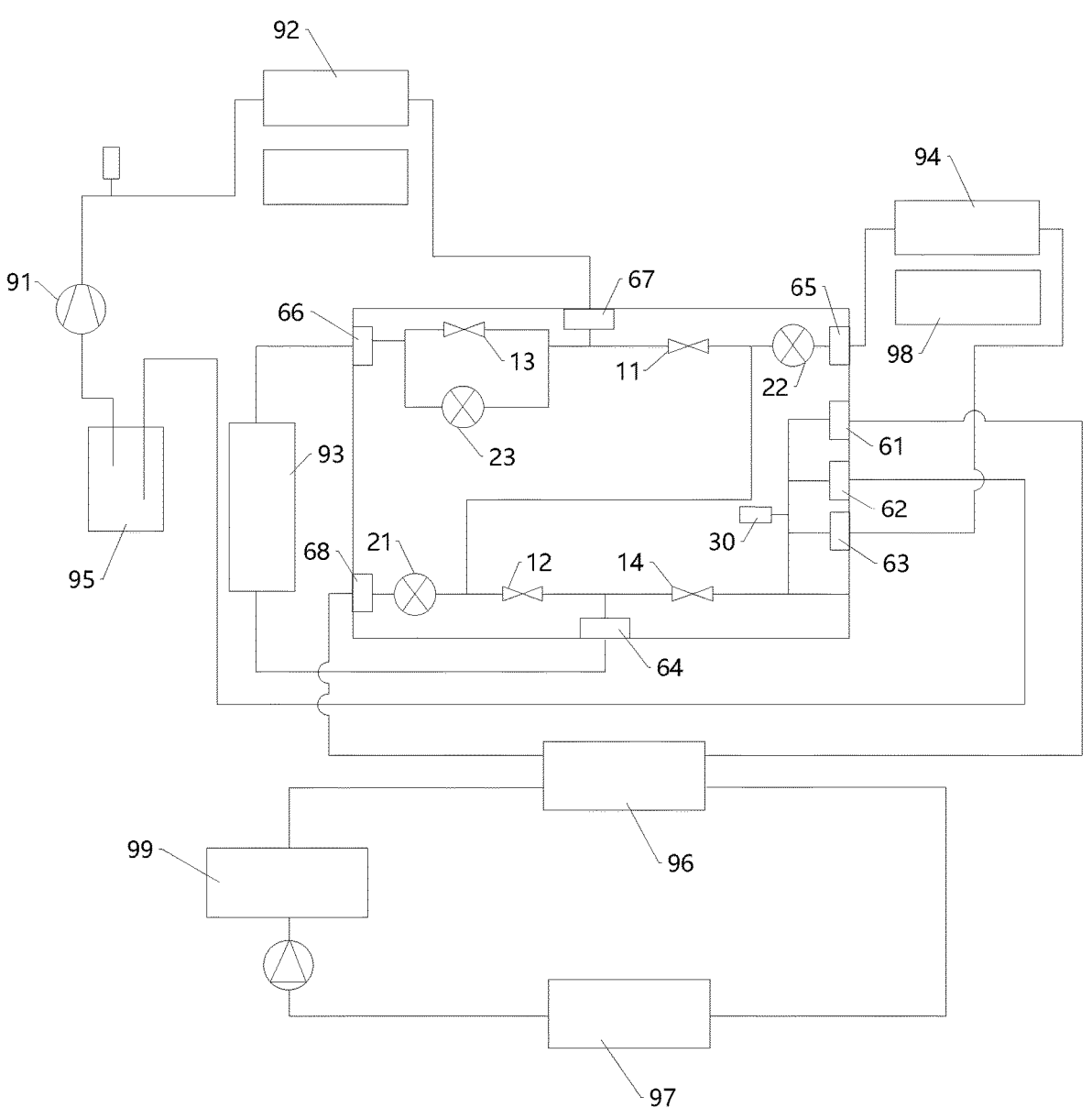
FIG. 7 is a schematic flow path diagram of a vehicle thermal management system according to an implementation of the present disclosure, a valve integrated on the integrated valve module and an interface on the integrated valve module being further shown.

For ease of understanding, flow paths of the refrigerant of the vehicle thermal management system in main operating modes are described in detail below based on the vehicle thermal management system shown in FIG. 6 and FIG. 7 and in combination with the integrated valve module shown in FIG. 1 to FIG. 5.

Mode I: A passenger compartment cooling mode. As shown in FIG. 6 and FIG. 7, in this mode, the main flow path of the refrigerant is: compressor 91→indoor condenser 92→third switch valve 13→outdoor heat exchanger 93→second switch valve 12→second expansion valve 22→indoor evaporator 94→gas-liquid separator 95→compressor 91. In this mode, the indoor evaporator 94 is a low-temperature and low-pressure refrigerant, and the refrigerant absorbs the heat of the crew compartment in the indoor evaporator 94 to realize the cooling of the crew compartment.

It should be noted that, in this mode, although the refrigerant flowing out of the outlet of the compressor 91 flows through the indoor condenser 92, the indoor condenser 92 may not be blown by a fan or a blower, so that the high-temperature and high-pressure refrigerant flowing into the indoor condenser 92 is not exothermally condensed in the indoor condenser 92. That is, in this mode, the indoor condenser 92 is configured as a through flow channel.

In conjunction with the integrated valve module provided in the present disclosure, a flow path of the refrigerant is: compressor 91→indoor condenser 92→indoor condenser outlet interface 67→second flow channel inlet 802→second flow channel 102→third switch valve inlet interface 801→third switch valve 13→third switch valve outlet interface 806→third flow channel 103→third flow channel outlet 804→outdoor heat exchanger inlet interface 66→outdoor heat exchanger 93→outdoor heat exchanger outlet interface 64→fourth flow channel inlet 810→fourth flow channel 104→second switch valve inlet interface 809→second switch valve 12→second switch valve outlet interface 807→first flow channel 101→second expansion valve inlet interface 818→second expansion valve 22→indoor evaporator inlet interface 65→indoor evaporator 94→indoor evaporator outlet interface 63→first through hole 813→fifth flow channel 105→third through hole 815→reflux inlet interface 62→gas-liquid separator 95→compressor 91.

Mode II: A battery pack 97 cooling mode. As shown in FIG. 6 and FIG. 7, in this mode, the main flow path of the refrigerant is: compressor 91→indoor condenser 92→third switch valve 13→outdoor heat exchanger 93→second switch valve 12→first expansion valve 21→battery pack heat exchanger 96→gas-liquid separator 95→compressor 91. The main flow path of the refrigerant is: battery pack 97→battery pack heat exchanger 96→battery pack 97. In this mode, in the battery pack heat exchanger 96, a low-temperature and low-pressure refrigerant absorbs heat of the high temperature coolant, so that a coolant outlet of the battery pack heat exchanger 96 flows out of the low temperature coolant. The low temperature cooling refrigerant can absorb the heat of the battery pack 97 when flowing through the battery pack 97, and realize the cooling of the battery pack 97.

It should be noted that, in this mode, although the refrigerant flowing out of the outlet of the compressor 91 flows through the indoor condenser 92, the indoor condenser 92 may not be blown by a fan or a blower, so that the high-temperature and high-pressure refrigerant flowing into the indoor condenser 92 is not exothermally condensed in the indoor condenser 92. That is, in this mode, the indoor condenser 92 is configured as a through flow channel.

In conjunction with the integrated valve module provided in the present disclosure, a flow path of the refrigerant is: compressor 91→indoor condenser 92→indoor condenser outlet interface 67→second flow channel inlet 802→second flow channel 102→third switch valve inlet interface 801→third switch valve 13→third switch valve outlet interface 806→third flow channel 103→third flow channel outlet 804→outdoor heat exchanger inlet interface 66→outdoor heat exchanger 93→outdoor heat exchanger outlet interface 64→fourth flow channel inlet 810→fourth flow channel 104→second switch valve inlet interface 809→second switch valve 12→second switch valve outlet interface 807→first flow channel 101→first expansion valve inlet interface 819→first expansion valve 21→battery pack heat exchanger inlet interface 68→battery pack heat exchanger 96→battery pack heat exchanger outlet interface 61→fourth through hole 816→fifth flow channel 105→third through hole 815→reflux inlet interface 62→gas-liquid separator 95→compressor 91.

Mode III: A passenger compartment cooling mode and battery pack 97 cooling mode. It may be understood that this mode is a same open mode of the mode I and mode II. In in this mode, the main flow path of the refrigerant is: compressor 91→indoor condenser 92→third switch valve 13→outdoor heat exchanger 93→second switch valve 12. Here, the refrigerant flowing out of the outlet of the second switch valve 12 is divided into two parts, with one of the two parts following a flow path as follows: second expansion valve 22→indoor evaporator 94→gas-liquid separator 95→compressor 91, and the other of the two parts following a flow path as follows: first expansion valve 21→battery pack heat exchanger 96→gas-liquid separator 95→compressor 91. The main flow path of the refrigerant is: battery pack 97→battery pack heat exchanger 96→battery pack 97. It should be noted that, in this mode, although the refrigerant flowing out of the outlet of the compressor 91 flows through the indoor condenser 92, the indoor condenser 92 may not be blown by a fan or a blower, so that the high-temperature and high-pressure refrigerant flowing into the indoor condenser 92 is not exothermally condensed in the indoor condenser 92. That is, in this mode, the indoor condenser 92 is configured as a through flow channel.

In conjunction with the integrated valve module provided in the present disclosure, a flow path of the refrigerant is: compressor 91→indoor condenser 92→indoor condenser outlet interface 67→second flow channel inlet 802→second flow channel 102→third switch valve inlet interface 801→third switch valve 13→third switch valve outlet interface 806→third flow channel 103→third flow channel outlet 804→outdoor heat exchanger inlet interface 66→outdoor heat exchanger 93→outdoor heat exchanger outlet interface 64→fourth flow channel inlet 810→fourth flow channel 104→second switch valve inlet interface 809→second switch valve 12→second switch valve outlet interface 807→first flow channel 101. The refrigerant in the first flow channel 101 is divided into two parts, with one of the two parts following a flow path as follows: second expansion valve inlet interface 818→second expansion valve 22→indoor evaporator inlet interface 65→indoor evaporator 94→indoor evaporator outlet interface 63→first through hole 813→fifth flow channel 105; and the other of the two parts following a flow path as follows: first expansion valve inlet interface 819→first expansion valve 21→battery pack heat exchanger inlet interface 68→battery pack heat exchanger 96→battery pack heat exchanger outlet interface 61→fourth through hole 816→fifth flow channel 105. That is to say, the refrigerant flowing out from the outlet of the indoor evaporator 94 and the refrigerant flowing out from the refrigerant outlet of the battery pack heat exchanger 96 respectively flow into the fifth flow channel 105 through the indoor evaporator outlet interface 63 and the battery pack heat exchanger outlet interface 61 and converge in the fifth flow channel 105. A flow path of the refrigerant after convergence is: third through hole 815→reflux inlet interface 62→gas-liquid separator 95→compressor 91.

Mode IV: A crew compartment heating mode. As shown in FIG. 6 and FIG. 7, in this mode, the main flow path of the refrigerant is: compressor 91→indoor condenser 92→third expansion valve 23→outdoor heat exchanger 93→fourth switch valve 14→gas-liquid separator 95→compressor 91. In this mode, the high-temperature and high-pressure refrigerant flowing out of the outlet of the compressor 91 flows into the indoor condenser 92 and exotherms in the indoor condenser 92, thereby improving the temperature of the crew compartment and realizing heating of the crew compartment. For an embodiment provided with a PTC air heater 98, the PTC air heater 98 may also be turned on in the crew compartment heating mode to heat the crew compartment together in conjunction with the indoor condenser 92.

In addition, in this mode, if the battery pack 97 has a heating requirement, the PTC water heater 99 in the coolant circuit formed by the battery pack 97 and the battery pack heat exchanger 96 in series can be turned on, and the coolant can be heated by the PTC water heater 99, thereby realizing the heating of the battery pack 97, and the heating mode of the crew compartment and the heating mode of the battery pack 97. In the crew compartment heating mode, since the refrigerant does not flow into the battery pack heat exchanger 96, only the coolant flows into the battery pack heat exchanger 96, and the coolant does not exchange heat in the battery pack heat exchanger 96. In this case, the battery pack heat exchanger 96 may be regarded as the through flow channel.

In conjunction with the integrated valve module provided in the present disclosure, a flow path of the refrigerant in mode IV is: compressor 91→indoor condenser 92→indoor condenser 92→indoor condenser outlet interface 67→second flow channel inlet 802→second flow channel 102→third expansion valve inlet interface 817→third expansion valve 23→third expansion valve outlet interface 805→third flow channel 103→third flow channel outlet 804→outdoor heat exchanger inlet interface 66→outdoor heat exchanger 93→outdoor heat exchanger outlet interface 64→fourth flow channel inlet 810→fourth flow channel 104→fourth switch valve inlet interface 811→fourth switch valve 14→fourth switch valve outlet interface 812→fifth flow channel 105→third through hole 815→reflux inlet interface 62→gas-liquid separator 95→compressor 91.

Mode V: A passenger compartment heating mode which utilizes the heat from the battery pack 97. As shown in FIG. 6 and FIG. 7, in this mode, the main flow path of the refrigerant is: compressor 91→indoor condenser 92→first switch valve 11→first expansion valve 21→battery pack heat exchanger 96→gas-liquid separator 95→compressor 91. In this mode, the high-temperature and high-pressure refrigerant flowing out of the outlet of the compressor 91 flows into the indoor condenser 92 and exotherms in the indoor condenser 92, thereby improving the temperature of the crew compartment and realizing heating of the crew compartment. In the battery pack heat exchanger 96, the low-temperature and low-pressure refrigerant absorbs the heat of the high temperature coolant, thereby transporting the heat of the battery pack 97 into the refrigerant for heating the crew compartment.

In conjunction with the integrated valve module provided in the present disclosure, a flow path of the refrigerant is: compressor 91→indoor condenser 92→indoor condenser 92 inlet interface→second flow channel inlet 802→second flow channel 102→first switch valve inlet interface 803→first switch valve 11→first switch valve outlet interface 808→first flow channel 101→first expansion valve inlet interface 819→first expansion valve 21→battery pack heat exchanger inlet interface 68→battery pack heat exchanger 96→battery pack heat exchanger outlet interface 61→fourth through hole 816→fifth flow channel 105→third through hole 815→reflux inlet interface 62→gas-liquid separator 95→compressor 91.

Mode VI: A crew compartment dehumidification mode. As shown in FIG. 6 and FIG. 7, in this mode, the main flow path of the refrigerant is: compressor 91→indoor condenser 92→third switch valve 13→outdoor heat exchanger 93→second switch valve 12→second expansion valve 22→indoor evaporator 94→gas-liquid separator 95→compressor 91. In this mode, the high-temperature and high-pressure refrigerant flowing out of the outlet of the compressor 91 is exothermic in the indoor condenser 92, and the indoor evaporator 94 is the low-temperature and low-pressure refrigerant. In this way, when hot moist air in the crew compartment encounters the cold indoor evaporator 94, water vapor in the moist air can be condensed into condensed water on the surface of the indoor evaporator 94, thereby dehumidifying the crew compartment.

In conjunction with the integrated valve module provided in the present disclosure, a flow path of the refrigerant is: compressor 91→indoor condenser 92→indoor condenser outlet interface 67→second flow channel inlet 802→second flow channel 102→third switch valve inlet interface 801→third switch valve 13→third switch valve outlet interface 806→third flow channel 103→third flow channel outlet 804→outdoor heat exchanger inlet interface 66→outdoor heat exchanger 93→outdoor heat exchanger outlet interface 64→fourth flow channel inlet 810→fourth flow channel 104→second switch valve inlet interface 809→second switch valve 12→second switch valve outlet interface 807→first flow channel 101→second expansion valve inlet interface 818→second expansion valve 22→indoor evaporator inlet interface 65→indoor evaporator 94→indoor evaporator outlet interface 63→first through hole 813→fifth flow channel 105→third through hole 815→reflux inlet interface 62→gas-liquid separator 95→compressor 91.

According to a second aspect of the present disclosure, a vehicle thermal management system is further provided. The system includes the integrated valve module.

According to a third aspect of the present disclosure, a vehicle is further provided, including the vehicle thermal management system.

The implementations of the present disclosure are described in detail above with reference to the accompanying drawings. However, the present disclosure is not limited to the details in the foregoing implementations, a plurality of simple deformations may be made to the technical solution of the present disclosure within a range of the technical concept of the present disclosure, and these simple deformations fall within the protection scope of the present disclosure.

In addition, it should be noted that the technical features described in the foregoing implementations may be combined in any proper manner in the case of no contradiction. In order to avoid unnecessary repetition, various possible combinations are not described separately in the present disclosure.

In addition, various different implementations of the present disclosure may also be arbitrarily combined without departing from the idea of the present disclosure, and the combinations shall still be regarded as the content disclosed in the present disclosure.

What is claimed is:

1. An integrated valve module, comprising:
a base and a valve set disposed on the base, the valve set comprising a first switch valve, a second switch valve, and a first expansion valve;
an indoor condenser outlet interface, an outdoor heat exchanger outlet interface and a battery pack heat exchanger inlet interface being disposed on the base, the indoor condenser outlet interface being configured to be connected with an outlet of an indoor condenser outside the base, the outdoor heat exchanger outlet interface being configured to be connected with an outlet of an outdoor heat exchanger outside the base, and the battery pack heat exchanger inlet interface being configured to be connected with a refrigerant inlet of a battery pack heat exchanger outside the base;
a first flow channel disposed on the base; an inlet of the first switch valve being in communication with the indoor condenser outlet interface; an outlet of the first switch valve being in communication with the first flow channel; an inlet of the first expansion valve being in communication with the first flow channel; an outlet of the first expansion valve being in communication with the battery pack heat exchanger inlet interface; the outdoor heat exchanger outlet interface being in communication with an inlet of the second switch valve; and an outlet of the second switch valve being in communication with the first flow channel; and
a third switch valve, wherein an outdoor heat exchanger inlet interface connected with an inlet of the outdoor heat exchanger is disposed on the base, a second flow channel is disposed in the base, the indoor condenser outlet interface is in communication with the second flow channel, the inlet of the first switch valve is in communication with the second flow channel an inlet of the third switch valve is in communication with the second flow channel, and an outlet of the third switch valve is in communication with the outdoor heat exchanger inlet interface.

2. The integrated valve module according to claim 1, further comprising a second expansion valve; wherein an indoor evaporator inlet interface configured to be connected with an inlet of an indoor evaporator outside the base is disposed on the base; an inlet of the second expansion valve is in communication with the first flow channel; and an outlet of the second expansion valve is in communication with the indoor evaporator inlet interface.

3. The integrated valve module according to claim 1, wherein by turning on/off of the first switch valve and the third switch valve, a refrigerant flowing into the second flow channel through the indoor condenser outlet interface flows into the first flow channel through the first switch valve, or flows out from the outdoor heat exchanger inlet interface through the third switch valve.

4. The integrated valve module according to claim 1, further comprising a third expansion valve; wherein a third flow channel is disposed in the base; the outdoor heat exchanger inlet interface is in communication with the third flow channel; the outlet of the third switch valve is in communication with the third flow channel; an inlet of the third expansion valve is in communication with the second flow channel; and an outlet of the third expansion valve is in communication with the third flow channel.

5. The integrated valve module according to claim 4, wherein by turning on/off of the third switch valve and throttling or turning off of the third expansion valve, a refrigerant flowing into the second flow channel through the indoor condenser outlet interface flows into the third flow channel through the third switch valve or flows into the third flow channel through the third expansion valve.

6. The integrated valve module according to claim 4, wherein the base comprises a first portion and a second portion; the first portion comprises a first connecting surface; the second portion comprises a second connecting surface; the first connecting surface is connected with the second connecting surface; the first connecting surface is recessed to form a first groove, a second groove, and a third groove; the second connecting surface and the first groove define the first flow channel; the second connecting surface and the second groove define the second flow channel; the second connecting surface and the third groove define the third flow channel; and the first switch valve, the second switch valve, the third switch valve, the first expansion valve, and the third expansion valve are disposed on the first portion; or the first switch valve, the second switch valve, the third switch valve, the first expansion valve, and the third expansion valve are disposed on the second portion.

7. The integrated valve module according to claim 6, wherein at least one of the first groove, the second groove, and the third groove comprises a curved groove.

8. The integrated valve module according to claim 1, wherein the valve set further comprises a fourth switch valve; a reflux inlet interface configured to be connected with an inlet of a compressor outside the base or an inlet of a gas-liquid separator connected with the compressor is disposed on the base; a fourth flow channel is disposed in the base; the outdoor heat exchanger outlet interface is in communication with the fourth flow channel; the inlet of the second switch valve is in communication with the fourth flow channel; an inlet of the fourth switch valve is in communication with the fourth flow channel; and an outlet of the fourth switch valve is in communication with the reflux inlet interface.

9. The integrated valve module according to claim 8, wherein a fifth flow channel is disposed in the base; the outlet of the fourth switch valve is in communication with the fifth flow channel; the reflux inlet interface is in communication with the fifth flow channel; a battery pack heat exchanger outlet interface configured to be connected with a refrigerant outlet of the battery pack heat exchanger is disposed on the base; and the battery pack heat exchanger outlet interface is in communication with the fifth flow channel.

10. The integrated valve module according to claim 9, wherein the fifth flow channel is disposed in the base; the outlet of the fourth switch valve is in communication with the fifth flow channel; the reflux inlet interface is in communication with the fifth flow channel; an indoor evaporator outlet interface configured to be connected with an outlet of an indoor evaporator is disposed on the base; and the indoor evaporator outlet interface is in communication with the fifth flow channel.

11. The integrated valve module according to claim 10, further comprising a temperature sensor, wherein a first through hole, a second through hole, and a third through hole are disposed on the fifth flow channel; the second through hole is located between the first through hole and the third through hole; the first through hole is in communication with the indoor evaporator outlet interface; the third through hole is in communication with the reflux inlet interface; the temperature sensor is disposed on the base; and a detection terminal of the temperature sensor passes through the second through hole and is located in the fifth flow channel.

12. The integrated valve module according to claim 8, wherein the base comprises a first portion and a second portion; the first portion comprises a first connecting surface; the second portion comprises a second connecting surface; the first connecting surface is connected with the second connecting surface; the first connecting surface is recessed to form a fourth groove and a fifth groove; the second connecting surface and the fourth groove define the fourth flow channel; the second connecting surface and the fifth groove define a fifth flow channel; and the fourth switch valve is disposed on the first portion or the second portion.

13. The integrated valve module according to claim 12, wherein at least one of the fourth groove and the fifth groove comprises a curved groove.

14. A vehicle thermal management system, comprising an integrated valve module, the integrated valve module comprising:

a base and a valve set disposed on the base, the valve set comprising a first switch valve, a second switch valve, and a first expansion valve;

an indoor condenser outlet interface, an outdoor heat exchanger outlet interface and a battery pack heat exchanger inlet interface being disposed on the base, the indoor condenser outlet interface being configured to be connected with an outlet of an indoor condenser outside the base, the outdoor heat exchanger outlet interface being configured to be connected with an outlet of an outdoor heat exchanger outside the base, and the battery pack heat exchanger inlet interface being configured to be connected with a refrigerant inlet of a battery pack heat exchanger outside the base;

a first flow channel disposed on the base; an inlet of the first switch valve being in communication with the indoor condenser outlet interface; an outlet of the first switch valve being in communication with the first flow channel; an inlet of the first expansion valve being in communication with the first flow channel; an outlet of the first expansion valve being in communication with the battery pack heat exchanger inlet interface; the outdoor heat exchanger outlet interface being in communication with an inlet of the second switch valve; and an outlet of the second switch valve being in communication with the first flow channel; and a third switch valve, wherein an outdoor heat exchanger inlet interface connected with an inlet of the outdoor heat exchanger is disposed on the base; a second flow channel is disposed in the base; the indoor condenser outlet interface is in communication with the second flow channel; the inlet of the first switch valve is in communication with the second flow channel; an inlet of the third switch valve is in communication with the second flow channel; and an outlet of the third switch valve is in communication with the outdoor heat exchanger inlet interface.

15. The vehicle thermal management system according to claim 14, wherein the integrated valve module further comprises a second expansion valve; an indoor evaporator inlet interface configured to be connected with an inlet of an indoor evaporator outside the base is disposed on the base; an inlet of the second expansion valve is in communication with the first flow channel; and an outlet of the second expansion valve is in communication with the indoor evaporator inlet interface.

16. The vehicle thermal management system according to claim 14, wherein by turning on/off of the first switch valve and the third switch valve, a refrigerant flowing into the second flow channel through the indoor condenser outlet interface flows into the first flow channel through the first switch valve, or flows out from the outdoor heat exchanger inlet interface through the third switch valve.

17. The vehicle thermal management system according to claim 14, wherein the integrated valve module further comprises a third expansion valve; a third flow channel is disposed in the base; the outdoor heat exchanger inlet interface is in communication with the third flow channel; the outlet of the third switch valve is in communication with the third flow channel; an inlet of the third expansion valve is in communication with the second flow channel; and an outlet of the third expansion valve is in communication with the third flow channel.

18. A vehicle, comprising a vehicle thermal management system comprising an integrated valve module, the integrated valve module comprising:

a base and a valve set disposed on the base, the valve set comprising a first switch valve, a second switch valve, and a first expansion valve;

an indoor condenser outlet interface, an outdoor heat exchanger outlet interface and a battery pack heat exchanger inlet interface being disposed on the base, the indoor condenser outlet interface being configured to be connected with an outlet of an indoor condenser outside the base, the outdoor heat exchanger outlet interface being configured to be connected with an outlet of an outdoor heat exchanger outside the base, and the battery pack heat exchanger inlet interface being configured to be connected with a refrigerant inlet of a battery pack heat exchanger outside the base;

a first flow channel disposed on the base; an inlet of the first switch valve being in communication with the indoor condenser outlet interface; an outlet of the first switch valve being in communication with the first flow channel; an inlet of the first expansion valve being in communication with the first flow channel; an outlet of the first expansion valve being in communication with the battery pack heat exchanger inlet interface; the outdoor heat exchanger outlet interface being in communication with an inlet of the second switch valve; and an outlet of the second switch valve being in communication with the first flow channel; and a third switch valve, wherein an outdoor heat exchanger inlet interface connected with an inlet of the outdoor heat exchanger is disposed on the base; a second flow channel is disposed in the base; the indoor condenser outlet interface is in communication with the second flow channel; the inlet of the first switch valve is in communication with the second flow channel; an inlet of the third switch valve is in communication with the second flow channel; and an outlet of the third switch valve is in communication with the outdoor heat exchanger inlet interface.

* * * * *